United States Patent
Thomas

(10) Patent No.: US 11,596,507 B2
(45) Date of Patent: *Mar. 7, 2023

(54) DISPOSABLE DENTAL WASTE FILTER DEVICE

(71) Applicant: Stoma Ventures, LLC, Chesterfield, MO (US)

(72) Inventor: Charles Thomas, Vero Beach, FL (US)

(73) Assignee: Stoma Ventures, LLC, Chesterfield, MO (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/313,467

(22) Filed: May 6, 2021

(65) Prior Publication Data
US 2022/0008178 A1 Jan. 13, 2022

Related U.S. Application Data

(63) Continuation-in-part of application No. 16/926,044, filed on Jul. 10, 2020, now Pat. No. 11,304,787.

(51) Int. Cl.
| | | |
|---|---|---|
| *B01D 29/01* | (2006.01) | |
| *A61C 17/06* | (2006.01) | |
| *B01D 35/157* | (2006.01) | |
| *B01D 29/11* | (2006.01) | |
| *B01D 35/30* | (2006.01) | |

(52) U.S. Cl.
CPC ............ *A61C 17/065* (2019.05); *B01D 29/01* (2013.01); *B01D 29/11* (2013.01); *B01D 35/157* (2013.01); *B01D 35/30* (2013.01); *B01D 2201/305* (2013.01)

(58) Field of Classification Search
CPC ...... A61C 17/065; B01D 29/01; B01D 29/11; B01D 29/56; B01D 35/157; B01D 35/30; B01D 2201/305; B01D 2201/34
See application file for complete search history.

(56) References Cited

U.S. PATENT DOCUMENTS

| | | |
|---|---|---|
| 5,571,412 A | 11/1996 | Nerli |
| 8,393,898 B2 | 3/2013 | McCary |
| 9,693,842 B2 * | 7/2017 | Thomas ................ F16K 5/0407 |
| 9,693,843 B2 * | 7/2017 | Cohen ..................... A61M 1/79 |
| 2018/0360578 A1 | 12/2018 | McCary |

* cited by examiner

*Primary Examiner* — Waqaas Ali
(74) *Attorney, Agent, or Firm* — David H. Chervitz

(57) ABSTRACT

A disposable dental waste filter device has a body having a tube receiving end having an outlet and a cap receiving end, a cap portion having an inlet and an end for insertion into the cap receiving end, a valve insert assembly for insertion into the body and the cap portion, and a filter assembly positioned within the body.

20 Claims, 14 Drawing Sheets

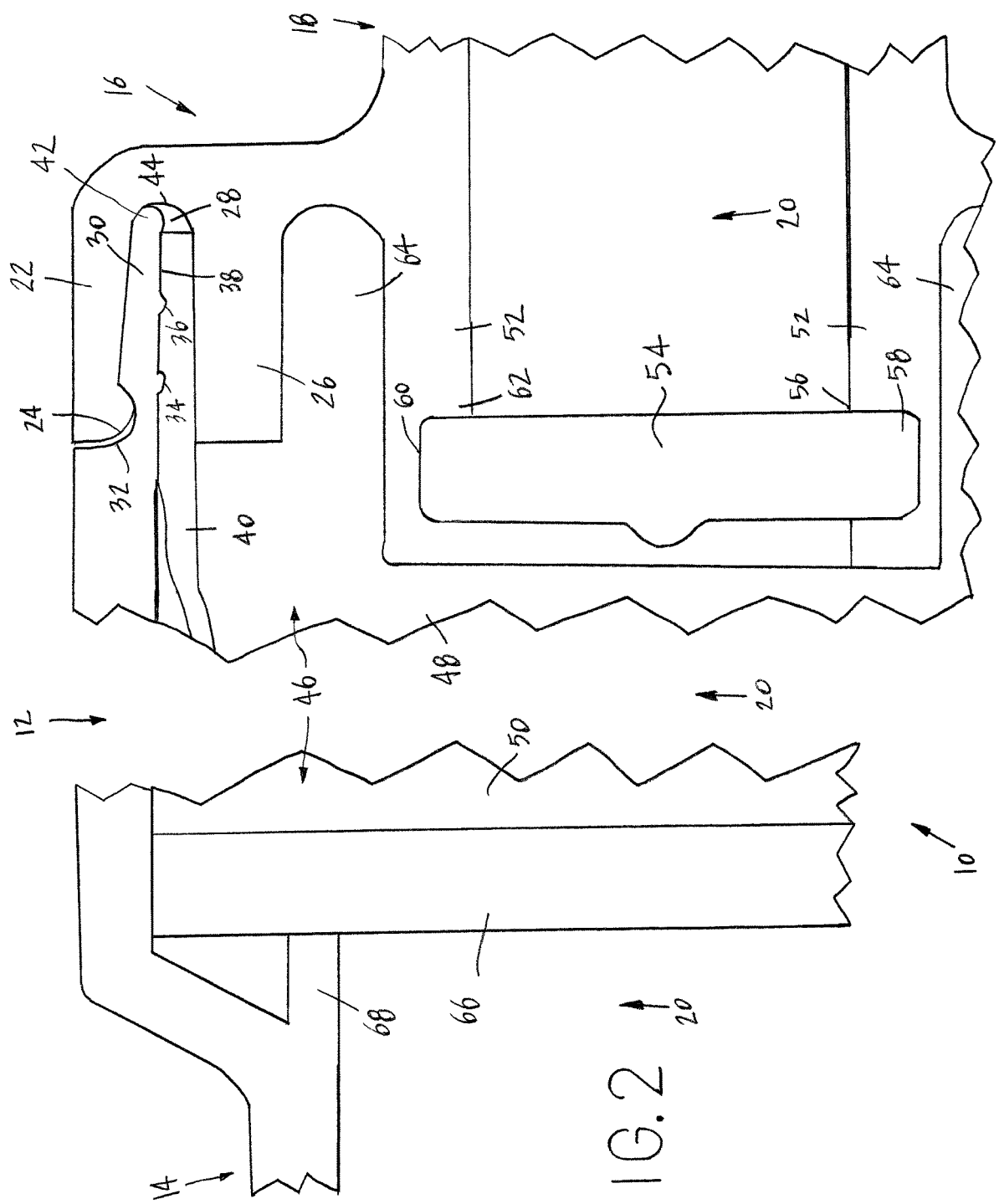

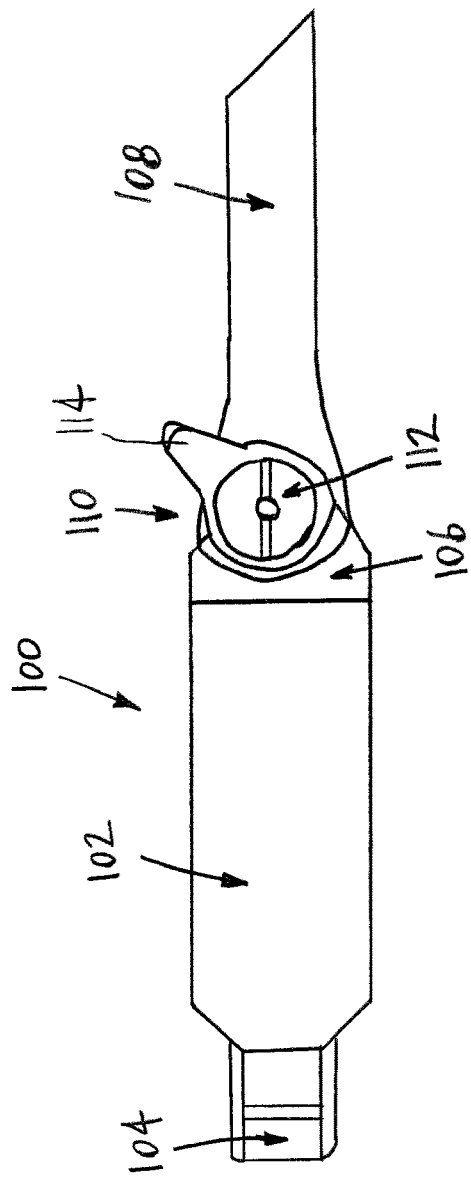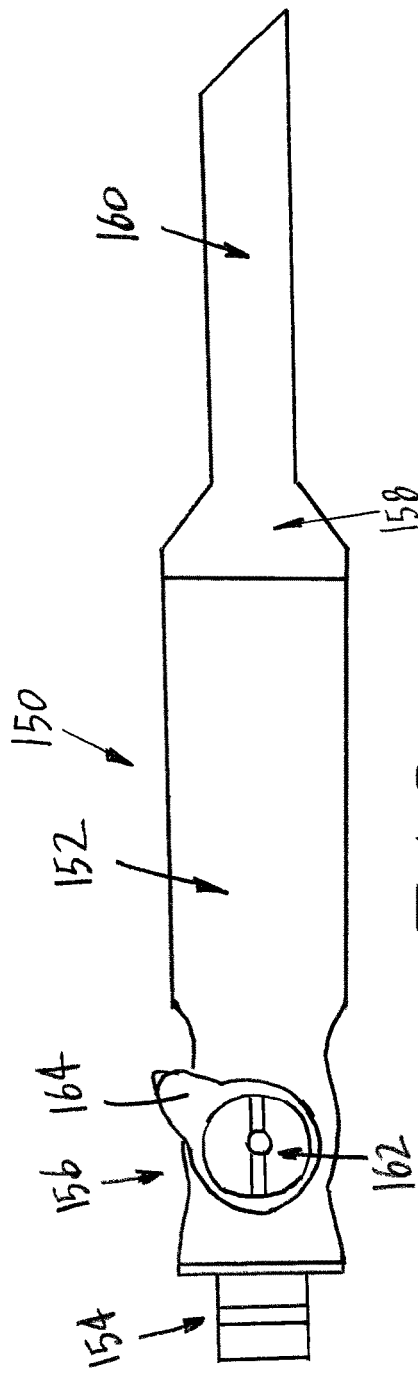

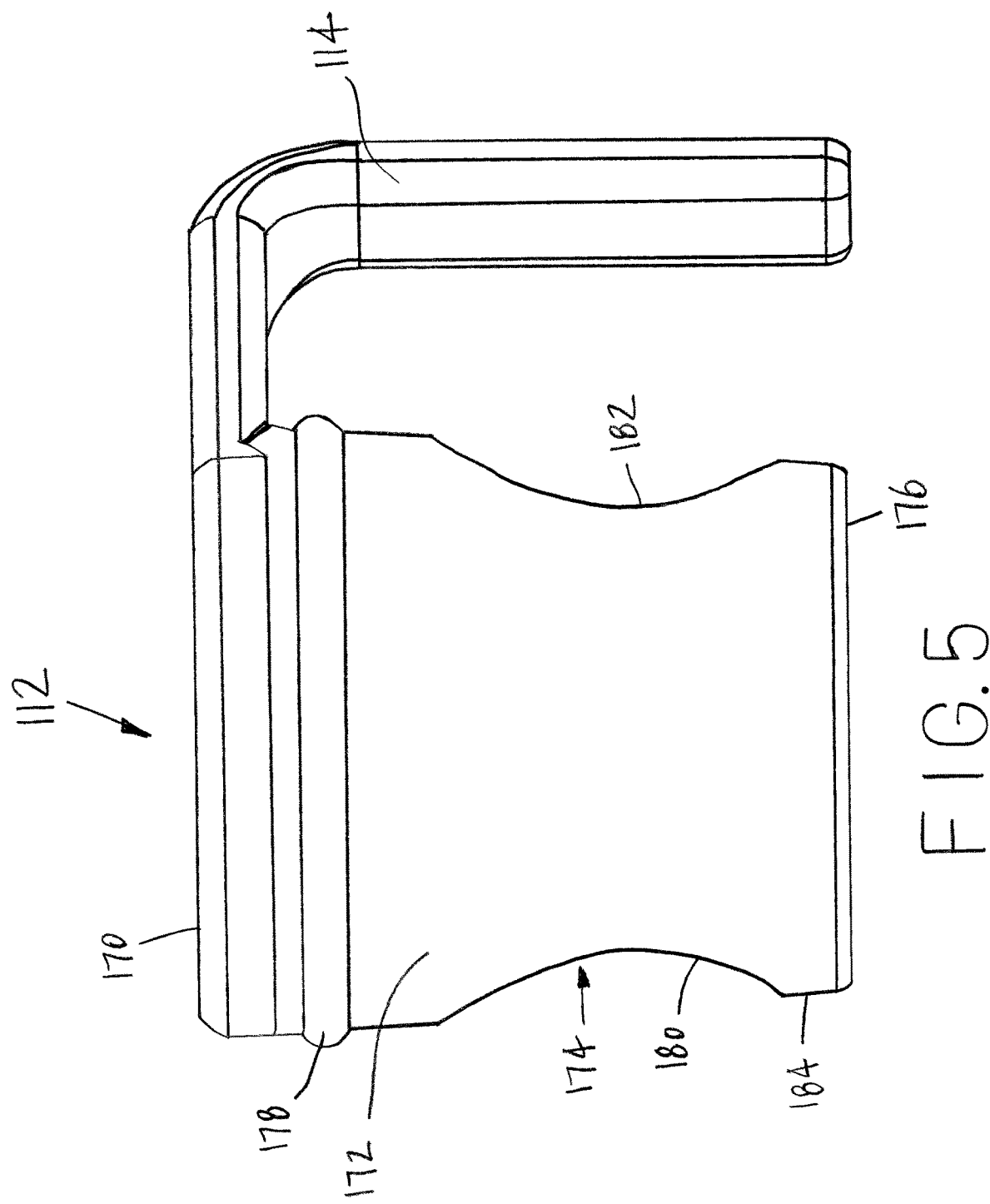

DISPOSABLE DENTAL WASTE FILTER DEVICE

RELATED APPLICATION

This application is a continuation-in-part of U.S. patent application Ser. No. 16/926,044, filed on Jul. 10, 2020, the disclosure of which is incorporated herein by reference.

BACKGROUND

This disclosure relates to a disposable dental filter device for use during a dental procedure and more particularly to a disposable dental waste filter device for capturing debris and other matter from a mouth of a patient during a dental procedure.

During a dental procedure it is important to be able to remove saliva, blood, water, tooth fragments, metals, and other debris or fluids from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector or a low volume ejector. A saliva ejector typically comprises a plastic flexible tube or straw for placement in the mouth of a patient. The saliva ejector tube is connected to a valve which in turn is connected via suction tubing to a source of vacuum. In this manner, saliva is passed through the ejector tube, the valve, and the tubing to be disposed of in a sanitary manner. Once the procedure is completed, the ejector should be discarded and the valve should be sterilized by autoclave to be used again. Although it is suggested to autoclave the valve after each use, it is known that the autoclave procedure is hardly ever done. Another device that is capable of removing solid materials is a high volume evacuator system. A high volume evacuator system generally consists of a rigid tube or straw that may be inserted into a mouth of a patient with the tube connected to a valve which is connected via a tubing to a source of vacuum. Again, in this manner, debris may be removed from the mouth of the patient. After the dental procedure, the tube is disposed of and the valve should be sterilized for reuse. However, although it is suggested to sterilize the valve after use, it is known that this suggested procedure is hardly ever followed.

As can be appreciated, the saliva ejector and the high volume evacuator are used to remove liquids and debris from a mouth of a patient to prevent a patient from swallowing or aspirating liquids and debris produced during a dental procedure. One such dental procedure is when dental fillings are removed or replaced. Dental fillings are used to fill cavities in teeth caused by tooth decay. The fillings may consist of a mixture of materials or metals that may include silver, mercury, copper, zinc, tin, or palladium. The fillings typically consist of half mercury and the other half some other metal or metals that form an amalgam. As is known, mercury is a poison that should be prevented from contaminating the environment. When drilling out the amalgam from a tooth, the amalgam should be captured or collected to prevent the mercury and other metals from entering into the environment such as waste water. Also, some of the metals, such as silver, are valuable and can be captured to be recycled for money.

In view of this, various separator systems and devices have been developed to capture the amalgam before it is introduced into waste water. One system is a vacuum system that has a collecting tank for collecting amalgam. The amalgam is suctioned from a mouth of a patient through a line into the collecting tank by a vacuum pump. Various problems exist with this type of system. In particular, such a system is expensive to purchase, to operate, and to maintain, takes up space in a dental office due to its size, and has a number of mechanical parts that can fail. Further, after collecting the amalgam, the amalgam must still be disposed of in an environmentally safe manner. The dental office typically sends the amalgam to a recycle center which is a time consuming proposition. Also, collection tank need to be cleaned by hand. Cleaning requires an individual to manually clean the tank and any other ancillary equipment which is an unpleasant experience and exposes the individual to hazardous material.

Another device that has been developed to capture or separate the amalgam is a disposable hand held amalgam separator device that is used to capture amalgam at the mouth of the patient. The disposable hand held amalgam separator device has a unitary body having an internal filter that is used to separate amalgam from other materials, such as saliva, water, tissue, or blood. After the dental procedure is completed and the device is filled with amalgam, the device is sent to a recycle center to retrieve any valuable or recyclable metals captured within the device. Although such a device is useful, when attempting to retrieve the recyclable metal from the interior of the device, the device must be cut open. Cutting the device open may result in the hazardous material being dispersed into the atmosphere and unto the individual cutting open the device. This may require that the room in which the device was opened to be cleaned resulting in added expense. This also may require the individual to wear a suit to prevent from coming into contact with the hazardous waste.

Therefore, it would be desirable to have a disposable dental waste filter device that captures any metal or other debris produced during a dental procedure for being able to properly dispose of the metal or other debris. It would also be desirable to have a disposable dental waste filter device that is easy to install on or remove from a dental valve attached to suction tubing connected to a source of vacuum. Further, it would be advantageous to have a disposable dental waste filter device that is easy to open to retrieve any valuable or recyclable material captured within the device.

BRIEF SUMMARY

In one form of the present disclosure, a disposable dental waste filter device comprises a body having a receiving end, and a separable cap having a tip end, the body for receiving and capturing therein amalgam that enters into the body through the tip end and the separable cap.

In another form of the present disclosure, a disposable dental waste filter device comprises a body having a receiving end, a central lumen for receiving and capturing amalgam, and a circular leg portion having an exterior channel, and a separable cap having a tip end, a circular outer rim having a circular end ridge portion with the ridge portion adapted to be inserted into the exterior channel of the body for a snap fit engagement between the cap and the body, the body for receiving and capturing therein amalgam that enters into the body through the tip end and the separable cap.

In yet another form of the present disclosure, a disposable dental waste filter device comprises a body having a receiving end, a central lumen for receiving and capturing amalgam, a filter, and a circular leg portion having an exterior channel, a separable cap having a tip end, a circular outer rim having a circular end ridge portion with the ridge portion adapted to be inserted into the exterior channel of the body for a snap fit engagement between the cap and the body, the body for receiving and capturing therein amalgam that enters into the body through the tip end and the separable cap, and a dental valve having a rotatable valve sealing body.

In still another form of the present disclosure, a disposable dental waste filter device comprises a body having a tube receiving end having an outlet and a cap receiving end, a cap portion having an inlet and an outlet end for insertion into the cap receiving end, a valve insert assembly for insertion into the body and the cap portion, and a filter assembly positioned within the body.

The present disclosure provides a disposable dental waste filter device for use during a dental procedure that is suitable for one time use and may be properly recycled after a single use.

The present disclosure is related to a disposable dental waste filter device that is easy to open to retrieve any valuable or recyclable material captured within the device.

The present disclosure provides a disposable dental waste filter device that is easy to install on a dental valve connected to suction tubing which is in turn connected to a source of vacuum.

The present disclosure provides a disposable dental waste filter device that is small, lightweight, easy to handle, easy to install, and easy to operate.

The present disclosure also provides a disposable dental waste filter device which is of simple construction and design and which can be easily employed with reliable results.

The present disclosure is related to a disposable dental waste filter device that does not require sterilization and captures metal that can be properly recycled.

The present disclosure provides a disposable dental waste filter device that may have an antimicrobial agent or chemical incorporated into the device to prevent any bacterial growth on the device. The antimicrobial agent or chemical may also be a coating applied to the disposable dental waste filter device.

The present disclosure is related to a disposable dental waste filter that may be constructed of plastic that is recyclable or biodegradable to reduce the cost of the device and to allow the device to be disposable and discarded after a single use.

The present disclosure provides a disposable dental waste filter device that is used to capture any metal produced during a dental procedure for recycling the metal.

The present disclosure is related to a disposable dental waste filter device that automatically suctions or captures any metal, debris, or other material produced during a dental procedure.

The present disclosure provides a disposable dental waste filter device that may be used with a high volume evacuator valve and does not require that the valve be retrofitted.

The present disclosure further provides a disposable dental waste filter device that does not require the device to be welded or glued during manufacturing of the device.

These and other advantages of the present disclosure will become apparent after considering the following detailed specification in conjunction with the accompanying drawings, wherein:

BRIEF DESCRIPTION OF THE DRAWINGS

FIG. 2 is an enlarged partial cross-sectional view of the disposable dental waste filter device shown in FIG. 1 taken along the plane of line 2-2;

FIG. 3 is a side view of another embodiment of a disposable dental waste filter device constructed according to the present disclosure;

FIG. 4 is a side view of another embodiment of a disposable dental waste filter device constructed according to the present disclosure;

FIG. 5 is a side view of the valve sealing body constructed according to the present disclosure being removed from the device shown in FIG. 3 or the device shown in FIG. 4;

DETAILED DESCRIPTION OF A PREFERRED EMBODIMENT

Figure 1:
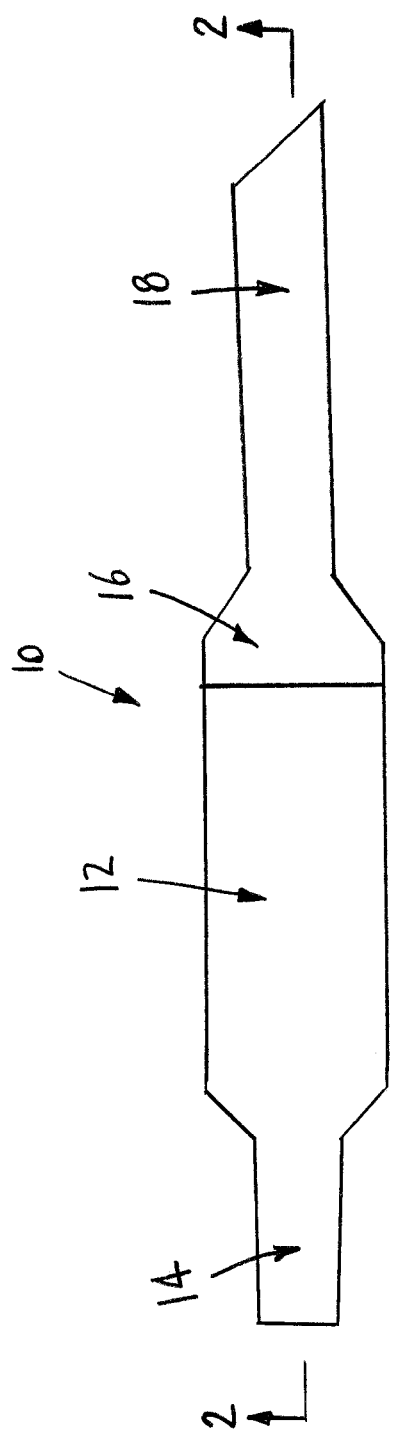
FIG. 1 is a side perspective view of a disposable dental waste filter device constructed according to the present disclosure.

Referring now to the drawings, wherein like numbers refer to like items, number 10 identifies a disposable dental waste filter device for use with a dental system (not shown) constructed according to the present disclosure. With reference now to FIG. 1, the device 10 comprises a body 12 having a receiving end 14 and a separable cap or lid portion 16 having a tip end 18. The valve receiving end 14 is adapted to be connected to a valve (not shown) or to a vacuum line (not shown) of a vacuum system (also not shown). As should be appreciated, the device 10 is used with a vacuum or suction system which provides suction through the device 10 and a hose or line so that any debris, liquid, or saliva that passes through the device 10 is properly disposed. The device 10 is constructed of material that allows the device 10 to be disposable and suitable for one time use. The tip end 18 is adapted to being inserted into a mouth of a patient during a dental procedure for collection of amalgam during the dental procedure. Amalgam is captured or collected within the body 12 of the device 10. After the dental procedure is completed, the device 10 is sent to a recycle center where any valuable metals captured within the device 10 may be retrieved by separating the cap portion 16 from the body 12. Further, any hazardous material, such as mercury, may be retrieved from the device 10 and properly disposed of by the recycle center.

With reference now to FIG. 2, an enlarged partial cross-sectional view of the disposable dental waste filter device 10 is shown. The device 10 comprises the body 12 having the receiving end 14 and the cap portion 16 having the tip end 18. The body 12, the receiving end 14, the cap portion 16, and the end 18 have a central lumen 20 through which debris, metals, and liquids may flow. The cap portion 16 has a circular outer rim 22 having a circular end ridge portion 24. The cap portion 16 also has a circular inner rim 26. An annular channel or ring 28 is formed between the rims 22 and 26. The body 12 has a circular leg portion 30 having an exterior channel or ring 32 that is adapted to receive the circular end ridge portion 24 for a snap fit engagement of the cap portion 16 to the body 12. The leg portion 30 also has a pair of nubs 34 and 36 on an interior surface 38 of the leg portion 30. The nubs 34 and 36 are used to capture and hold a filter element 40. The filter element 40 may be a bag, capsule, or container type filter. The leg portion 30 also has a rounded end 42 that abuts a rounded end 44 of the channel 28. This engagement of the ends 42 and 44 further assists in holding and securing the cap portion 16 to the body 12.

The body 12 has a central core or lumen 46 which is larger or wider than the central lumen 20. The central core 46 is used to capture amalgam that enters the central core 46 through the central lumen 20. As can be appreciated, the central core 46 is larger than the central lumen 20 to be able to capture as much amalgam as possible. The central core 46 has a front end 48 and a rear end 50. The front end 48 has a circular ring 52 having a flap 54 inserted therein in a bottom cavity 56. The flap has a bottom end 58 and a top end 60. The bottom end 58 is fitted into and captured within the bottom cavity 56. The top end 60 is free to move backwards into the central core 46. The circular ring 52 has an upper ledge 62 against which the top end 60 of the flap 54 butts against. The flap 54 is in a closed position when the top end 60 is against the upper ledge 62. The flap 54 is in the opened position when the top end 60 moves away from the upper ledge 62 into the central core 46. The flap 54 is used to contained any amalgam that enters into the central core 46 through the tip receiving end 18. The flap 54 prevents any amalgam from escaping from within the body 12 since the flap 54 can only open in one direction. An annular channel 64 is also formed between the circular ring 52 and the circular inner rim 26. The annular channel 64 is capable of capturing amalgam. The rear end 50 of the central core 46 has a filter 66 that is used to prevent any amalgam from entering into the receiving end 14, a vacuum system, and ultimately into a waste stream. The filter 66 may be a circular or puck shaped device. The filter 66 is held in place against a circular rim portion 68. The filter 66 serves as a final stage filter or a secondary filter to the filter element 40 to capture any amalgam that may get past the filter element 40.

FIG. 3 illustrates another embodiment of a disposable dental waste filter device 100 constructed according to the present disclosure. The device 100 comprises a body 102 having a receiving end 104 and a separable cap or lid portion 106 having a tip end 108 and a dental valve 110. The valve receiving end 104 is barbed and adapted to be connected to a tailpiece (not shown) or to a vacuum hose or line (not shown) of a vacuum system (also not shown). As should be appreciated, the device 100 is used with a vacuum or suction system which provides suction through the device 100 and a hose or line so that any debris, liquid, or saliva that passes through the device 100 is properly disposed. The device 100 is constructed of material that allows the device 100 to be disposable and suitable for one time use. The tip end 108 is adapted to being inserted into a mouth of a patient during a dental procedure for collection of amalgam during the dental procedure. Amalgam is captured or collected within the body 102 of the device 100. After the dental procedure is completed, the device 100 is sent to a recycle center where any valuable metals captured within the device 100 may be retrieved by separating the cap portion 106 from the body 102. Further, any hazardous material, such as mercury, may be retrieved from the device 100 and properly disposed of by the recycle center. The dental valve 110 is used to control a source of vacuum connected to the device 100. The dental valve 110 has a rotatable valve sealing body 112 having a handle 114 for operating the rotatable valve sealing body 112. Manual operation of the handle 114 will open the dental valve 110, or close the dental valve 110, or partially open the dental valve 110. The manner in which the cap portion 106 is connected to the body 102 is the same as described and disclosed with respect to the device 10. Further, the interior of the body 102, the structure of the body 102, and the components within the body 102 are the same as discussed with respect to the device 10.

With reference now to FIG. 4, another embodiment of a disposable dental waste filter device 150 constructed according to the present disclosure. The device 150 comprises a body 152 having a receiving end 154 having a dental valve 156 and a separable cap or lid portion 158 having a tip end 160. The valve receiving end 154 is barbed and adapted to be connected to a tailpiece (not shown) or to a vacuum hose or line (not shown) of a vacuum system (also not shown). As should be appreciated, the device 150 is used with a vacuum or suction system which provides suction through the device 150 and a hose or line so that any debris, liquid, or saliva that passes through the device 150 is properly disposed. The device 150 is constructed of material that allows the device 150 to be disposable and suitable for one time use. The tip end 160 is adapted to being inserted into a mouth of a patient during a dental procedure for collection of amalgam during the dental procedure. Amalgam is captured or collected within the body 152 of the device 150. After the dental procedure is completed, the device 150 is sent to a recycle center where any valuable metals captured within the device 150 may be retrieved by separating the cap portion 158 from the body 152. Further, any hazardous material, such as mercury, may be retrieved from the device 150 and properly disposed of by the recycle center. The dental valve 156 is used to control a source of vacuum connected to the device 150. The dental valve 156 has a rotatable valve sealing body 162 having a handle 164 for operating the rotatable valve sealing body 162. Manual operation of the handle 164 will open the dental valve 156, or close the dental valve 156, or partially open the dental valve 156. The manner in which the cap portion 160 is connected to the body 152 is the same as described and disclosed with respect to the device 10. Further, the interior of the body 152, the structure of the body 152, and the components within the body 152 are the same as discussed with respect to the device 10.

FIG. 5 depicts the rotatable valve sealing body 112 being removed from the dental valve 110 of the device 100. The rotatable valve sealing body 112 has a top 170, a central body portion 172 having a bore 174, and a bottom 176. The handle 114 is part of the top 170. The central body portion 172 also has an annular ridge portion 178 near the top 170. The ridge portion 178 is capable of fitting into a ring (not shown) in a snap fit engagement to secure the rotatable valve sealing body 112 within the dental valve 110. The bore 174 is adapted to be aligned with a central lumen (not shown) of the body 102 (FIG. 3). When the bore 174 is aligned with the lumen, the device 100 is in an opened position and the source of vacuum will draw any amalgam, fluid, or debris from the tip end 108 through the lumen and the bore 174 into the body 102. As can be appreciated, fluid will escape through the receiving end 104. In this manner, fluid may be removed from a mouth during a dental procedure or operation. The rotatable valve sealing body 112 also has a first opening 180 and a second opening 182. The openings 180 and 182 are aligned with the bore 174. When the rotatable valve sealing body 112 is in a closed position, the central body portion 172 will block any air flow through the dental valve 110 and the device 100. In essence, the bore 174 is no longer aligned with the tip end 108. The rotatable valve sealing body 112 is moved into the closed position by use of the handle 114. The openings 180 and 182 are concave and this provides a lower annular ring 184 that is formed in the sealing body 112.

Figure 6:
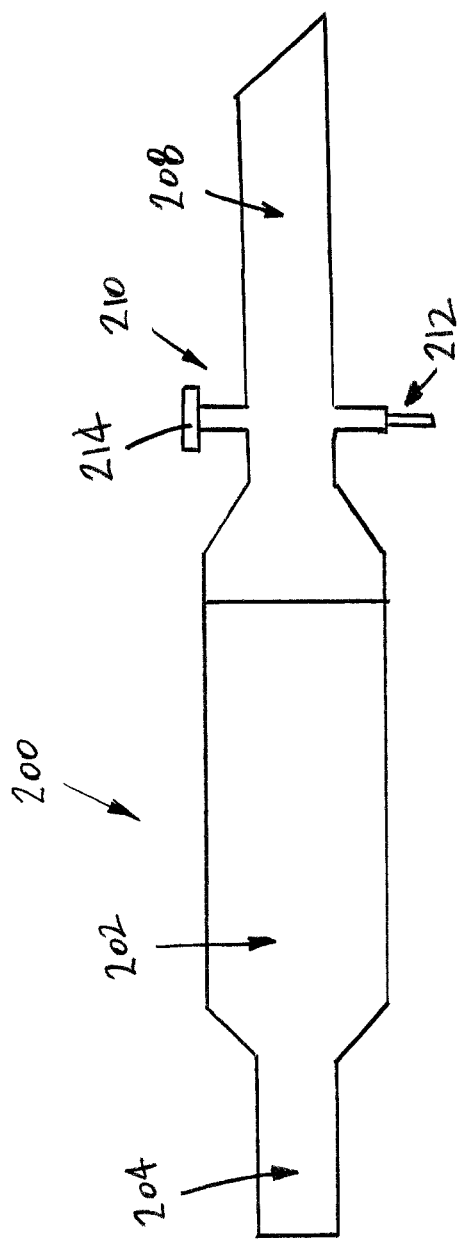
FIG. 6 is a side view of another embodiment of a disposable dental waste filter device constructed according to the present disclosure.

With particular reference now to FIG. 6, another embodiment of a disposable dental waste filter device 200 constructed according to the present disclosure. The device 200 comprises a body 202 having a receiving end 204 and a separable cap or lid portion 206 having a tip end 208 and a dental valve 210. The valve receiving end 204 is adapted to be connected to a tailpiece (not shown) or to a vacuum hose or line (not shown) of a vacuum system (also not shown). As should be appreciated, the device 200 is used with a vacuum or suction system which provides suction through the device 200 and a hose or line so that any debris, liquid, or saliva that passes through the device 200 is properly disposed. The device 200 is constructed of material that allows the device 200 to be disposable and suitable for one time use. The tip end 208 is adapted to being inserted into a mouth of a patient during a dental procedure for collection of amalgam during the dental procedure. Amalgam is captured or collected within the body 202 of the device 200. After the dental procedure is completed, the device 200 is sent to a recycle center where any valuable metals captured within the device 200 may be retrieved by separating the cap portion 206 from the body 202. Further, any hazardous material, such as mercury, may be retrieved from the device 200 and properly disposed of by the recycle center. The dental valve 210 is used to control a source of vacuum connected to the device 200. The dental valve 210 has a movable valve sealing body 212 having a handle 214 for operating the movable valve sealing body 212. Manual operation of the handle 214 will open the dental valve 210, or close the dental valve 210, or partially open the dental valve 210. The manner in which the cap portion 206 is connected to the body 202 is the same as described and disclosed with respect to the device 10. Further, the interior of the body 202, the structure of the body 202, and the components within the body 202 are the same as discussed with respect to the device 10. Although not shown, it is also contemplated to position the dental valve 210 on the receiving end 204 instead of the tip end 208.

Figure 7:
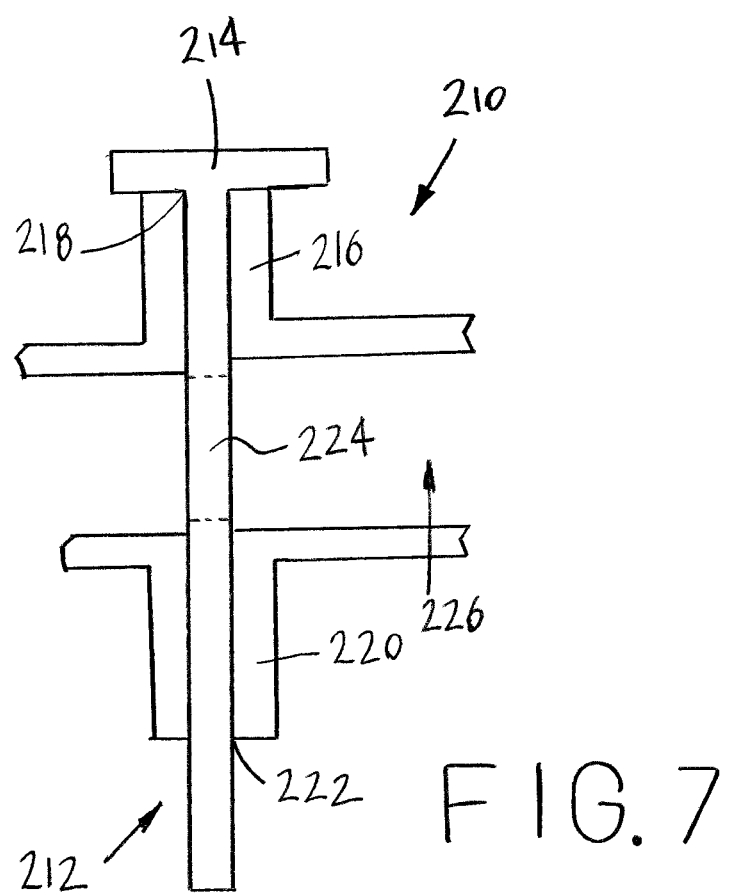
FIG. 7 is an enlarged partial cross-sectional view of a dental valve of the disposable dental waste filter device shown in FIG. 6.

FIG. 7 shows an enlarged partial cross-sectional view of the dental valve 210. The dental valve 210 comprises an upper extension portion 216 formed therein with the upper extension portion 216 having an upper opening 218. A lower extension portion 220 is formed in the dental valve 210 having a lower opening 222. The movable valve sealing device 212 also has an opening 224 formed therein for allowing the passage of any saliva, liquid, amalgam, or debris to pass there through when the movable valve sealing device 212 is in an opened position, as is depicted in FIG. 7. The movable valve sealing body 212 is capable of sliding or moving through the openings 218 and 222. In particular, the movable valve sealing body 212 may be positioned to a closed position by grasping the handle 214 and moving the handle 214 upwardly so that the opening 224 is not within a lumen 226 and thereby blocking any suction or air flow. In essence, the opening 224 is now positioned in the upper extension portion 216 when the dental valve 210 is in the closed position.

Figure 8:
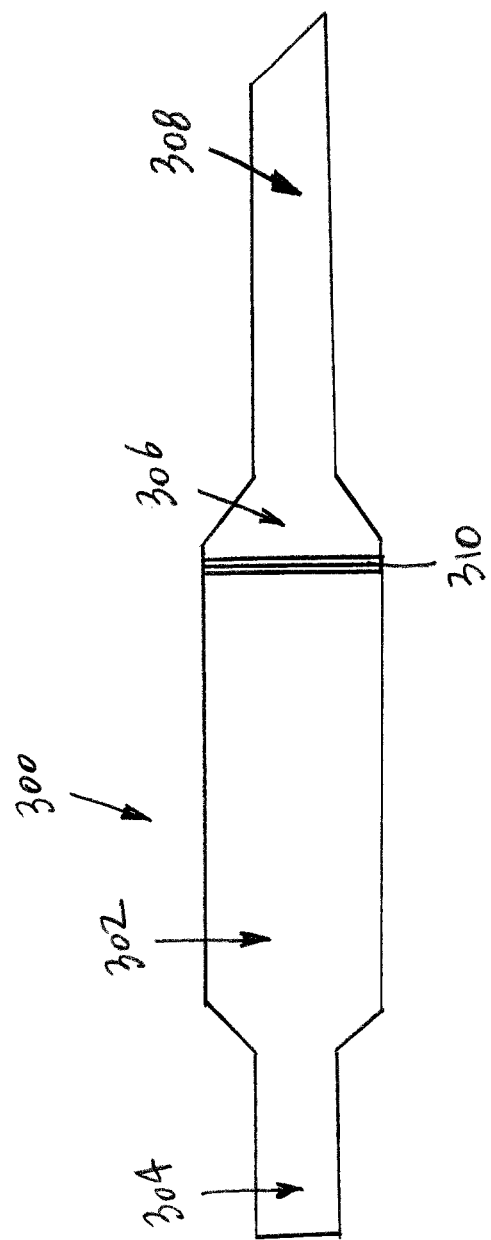
FIG. 8 is a side view of another embodiment of a disposable dental waste filter device constructed according to the present disclosure.

Referring now to FIG. 8, another embodiment of a disposable dental waste filter device 300 is illustrated. The device 300 comprises a body 302 having a receiving end 304 and a separable cap or lid portion 306 having a tip end 308. The cap portion 306 is secured to the body 302 by use of threads 310. Although not shown, the cap portion 306 will also have mating threads that thread onto the threads 310. In this manner, the cap portion 306 may be screwed on or off of the body 302. Further, it is possible that the body 302 may be reusable and fitted with a new cap portion 306. It is also contemplated that a removable filter capsule, container, or bag may be inserted into the body 302 and removed from the body 302 to make the body 302 reusable. The receiving end 304 is adapted to be connected to a valve (not shown) or to a vacuum line (not shown) of a vacuum system (also not shown). The device 300 is used with a vacuum or suction system which provides suction through the device 300 and a hose or line so that any debris, liquid, or saliva that passes through the device 300 is properly disposed. The device 300 is constructed of material that allows the device 300 to be disposable and suitable for one time use. The tip end 308 is adapted to being inserted into a mouth of a patient during a dental procedure for collection of amalgam during the dental procedure. Amalgam is captured or collected within the body 302 of the device 300. After the dental procedure is completed, the device 300 is sent to a recycle center where any valuable metals captured within the device 300 may be retrieved by unscrewing the cap portion 306 from the body 302. Further, any hazardous material, such as mercury, may be retrieved from the device 300 and properly disposed of by the recycle center.

Figure 9:
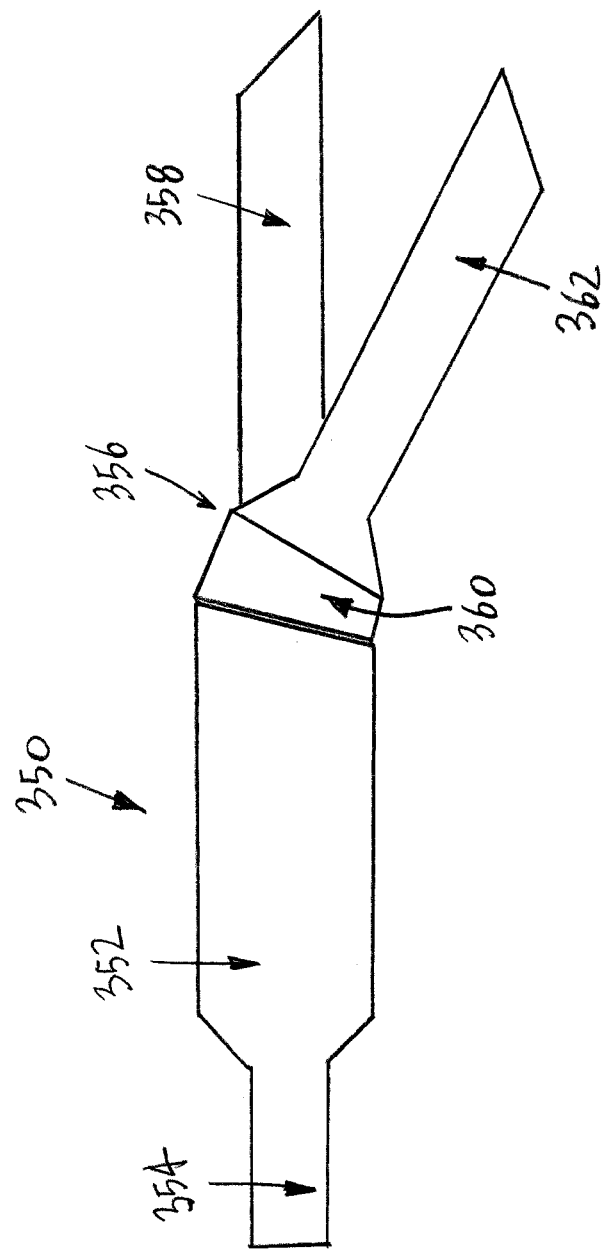
FIG. 9 is a side view of another embodiment of a disposable dental waste filter device constructed according to the present disclosure.

FIG. 9 shows another embodiment of a disposable dental waste filter device 350. The device 350 comprises a body 352 having a receiving end 354 and a separable cap or lid portion 356 having a tip end 358. The cap portion 356 has a swivel mechanism 360 that allows tip end 358 to swivel or move into various positions. For example, the tip end 362 shows how the tip end 362 may be moved relative to the position of the tip end 358. The cap portion 356 may be secured to the body 352 in any manner herein disclosed. The receiving end 354 is adapted to be connected to a valve (not shown) or to a vacuum line (not shown) of a vacuum system (also not shown). The device 350 is used with a vacuum or suction system which provides suction through the device 350 and a hose or line so that any debris, liquid, or saliva that passes through the device 350 is properly disposed. The device 350 is constructed of material that allows the device 350 to be disposable and suitable for one time use. The tip end 358 is adapted to being inserted into a mouth of a patient during a dental procedure for collection of amalgam during the dental procedure. Amalgam is captured or collected within the body 352 of the device 350. After the dental procedure is completed, the device 350 is sent to a recycle center where any valuable metals captured within the device 350 may be retrieved by separating the cap portion 356 from the body 352 and retrieving amalgam captured therein. Further, any hazardous material, such as mercury, may be retrieved from the device 350 and properly disposed of by the recycle center.

Figure 10:
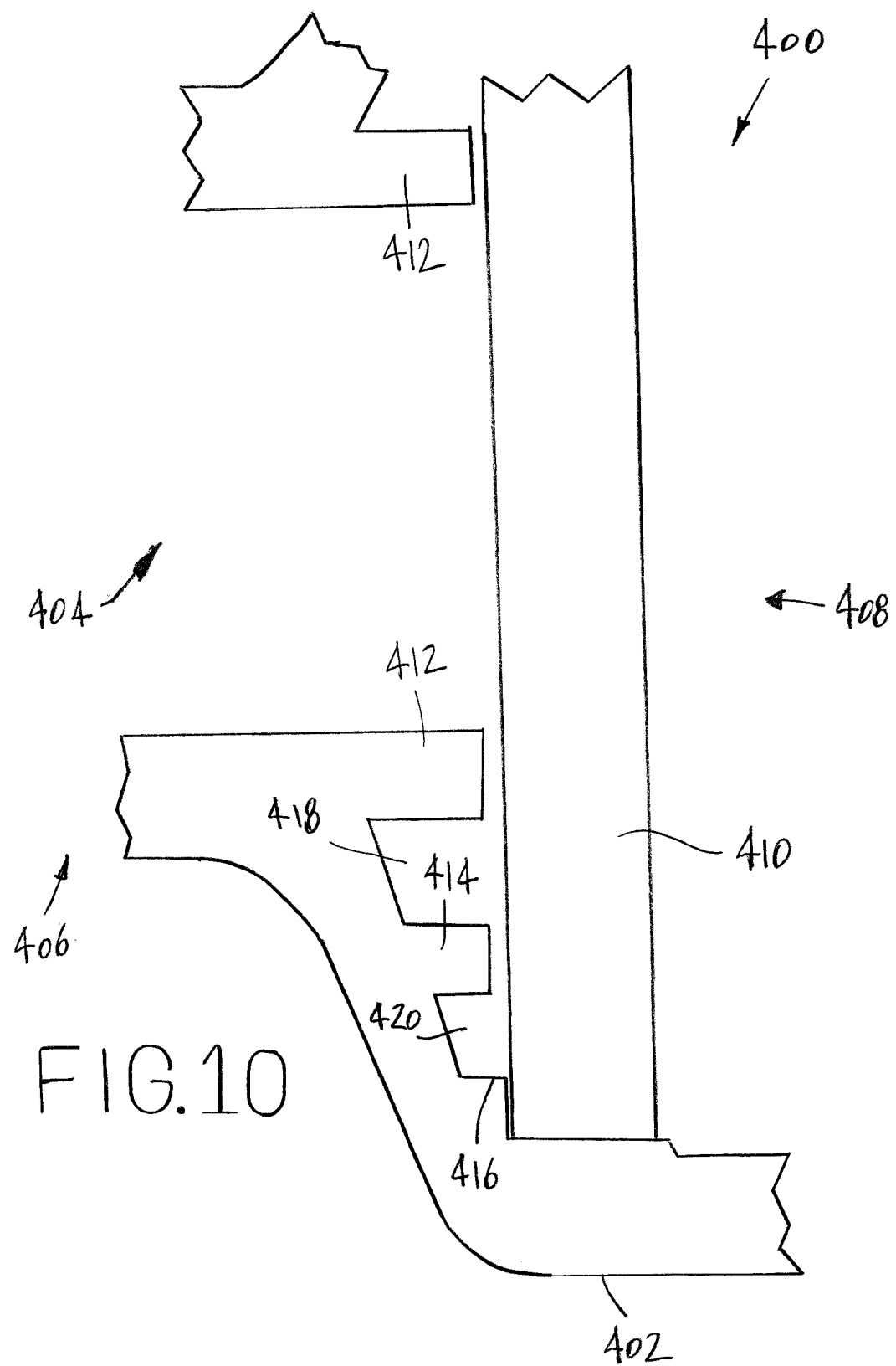
FIG. 10 is a partial cross-sectional view of another embodiment of a disposable dental waste filter device constructed according to the present disclosure.

With reference now to FIG. 10, another embodiment of a disposable dental waste filter device 400 is shown. The device 400 is only shown partially in this particular view. As should be appreciated, the device 400 is similar to the device 10 (FIGS. 1 and 2) with the exception being that the circular rim 68 (FIG. 2) has been modified to provide an airflow path in a labyrinth type construction. The device 400 has a body 402 having a central lumen 404 and a receiving end 406. A central core or lumen 408 which is used to capture amalgam that enters into the device 400. A filter 410 is provided within the central core 408 and the filter 410 is provided to prevent any amalgam from entering into the receiving end 406 through the central lumen 404. The filter 410 may be a circular or puck shaped device. The filter 410 is held in place against a first circular rim portion 412, a second circular rim portion 414, and a third circular rim portion 416. A first pocket 418 is formed between the first circular rim portion 412 and the second circular rim portion 414. A second pocket 420 is formed between the second circular rim portion 414 and the third circular rim portion 416. The pockets 418 and 420 provide for flow of air, saliva, liquids, and other matter through the filter 410 into the central lumen 404 and out through the receiving end 406.

Figure 11:
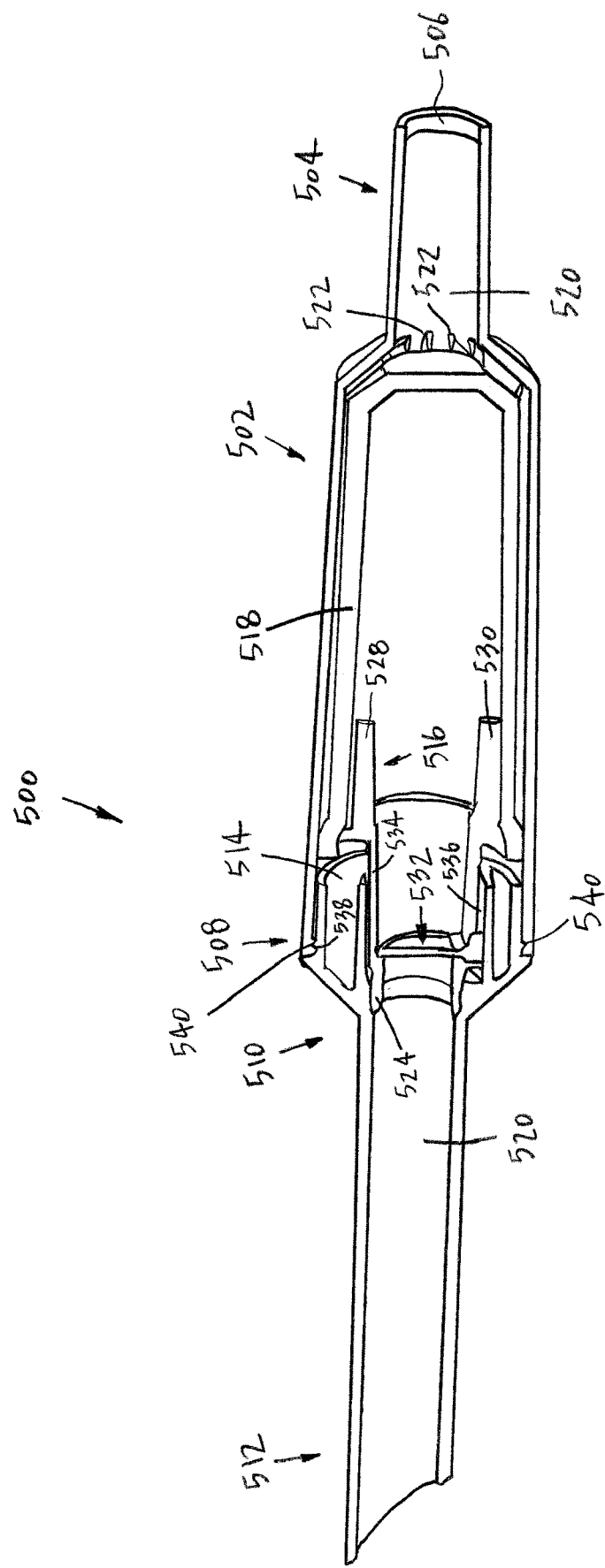
FIG. 11 is a cross-sectional view of another embodiment of a disposable dental waste filter device constructed according to the present disclosure.
Figure 12:
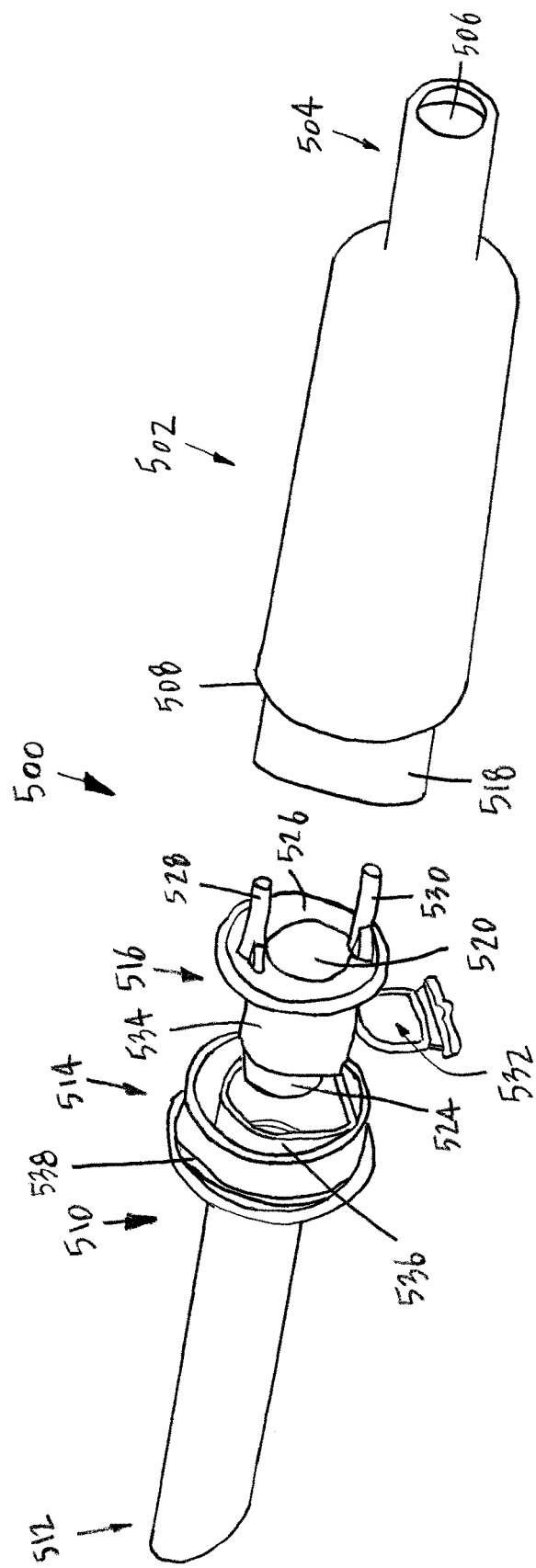
FIG. 12 is an exploded view of the disposable dental waster filter device shown in FIG. 11.

With particular reference now to FIGS. 11 and 12, another embodiment of a disposable dental waste filter device 500 constructed according to the present disclosure is illustrated. The disposable dental waste filter device 500 comprises a body 502 having a suction tube receiving end 504 having an outlet 506 and a cap receiving end 508, a cap portion 510 having an inlet end 512 and an outlet end 514 for insertion into the cap receiving end 508, a valve insert assembly 516 for insertion into the body 502 and the cap portion 510, and a filter assembly 518. A lumen 520 is formed between the inlet end 512 and the outlet 506 through which debris, metals, amalgam, and liquids may flow to be captured in the filter assembly 518. The filter assembly 518 may be constructed of a material that is capable of capturing amalgam or other metals or debris as small as 1 micron. The body 502 also has a number or a plurality of ribs 522 for spacing the filter assembly 518 away from the body 502. The valve insert assembly 516 comprises an inlet end 524 for insertion into the outlet end 514 of the cap portion 510 and an outlet end 526 having a pair of prongs or posts 528 and 530 that are used to open up and retain the filter assembly 518. The posts 528 and 530 also assist in the assembly of the device 500. A valve 532 is inserted into the valve insert assembly 516 to block the lumen 520, as will be explained in detail further herein. The valve 532 prevents any amalgam that is captured within the filter assembly 518 from escaping from within the filter assembly 518 and out through the inlet end 512 since the valve 532 can only open in one direction. The valve insert assembly 516 also has a middle portion 534 that is sized and shaped to fit within a retaining end 536 of the cap portion 510. The cap portion 510 also has a circular rim 538 that is used to snap into a circular recess 540 formed in the body 502 to secure or lock the cap portion 510 to the body 502 in a snap fit type engagement. The device 500 may have the cap portion 510 removed from the body 502 to assess the filter assembly 518. By use of the rim 538 and the recess 540 the device 500 is separable into two pieces.

Figure 13:
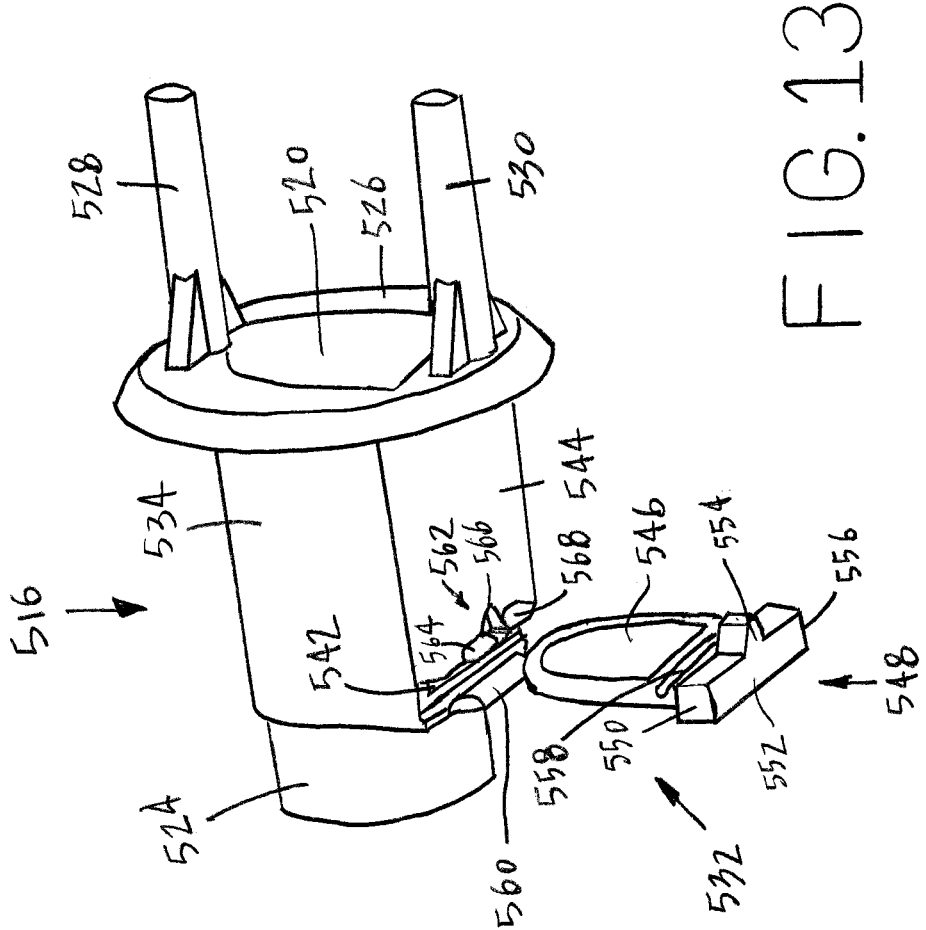
FIG. 13 is an exploded view of a valve insert assembly and a flap valve of the disposable dental water filter device shown in FIG. 11.

FIG. 13 depicts an exploded view of the valve insert assembly 516 and the valve 532. In this particular view, the valve 532 has been removed from an opening 542 formed in a bottom 544 of the valve insert assembly 516. The valve 532 has a flap portion 546 and a retention portion 548. The flap portion 546 is generally semicircular in shape. The retention portion 548 has a first end 550, a central portion 552 having an extension member 554, and a second end 556. The valve 532 also has hinge 558 formed between the flap portion 546 and the retention portion 548. The bottom 544 of the valve insert assembly 516 has the opening 542, a first ledge member 560, and a second ledge member 562 having a first ledge portion 564, a central indented ledge portion 566, and a second ledge portion 568. The central indented ledge portion 566 is for capturing the central portion 554 to retain the retention portion 548 in the bottom 544 of the valve insert assembly 516. The first ledge member 560 and the second ledge member 562 are also used to hold the retention portion 548 in place on the bottom 544 of the valve insert assembly 516. The flap portion 546 is sized and shaped to fit through the opening 542 to slide the flap portion 546 in place within the lumen 520. The valve insert assembly 516 is also shown having the inlet end 524 and the outlet end 526 having the pair of posts 528 and 530. The valve insert assembly 516 also has the middle portion 534.

Figure 14:
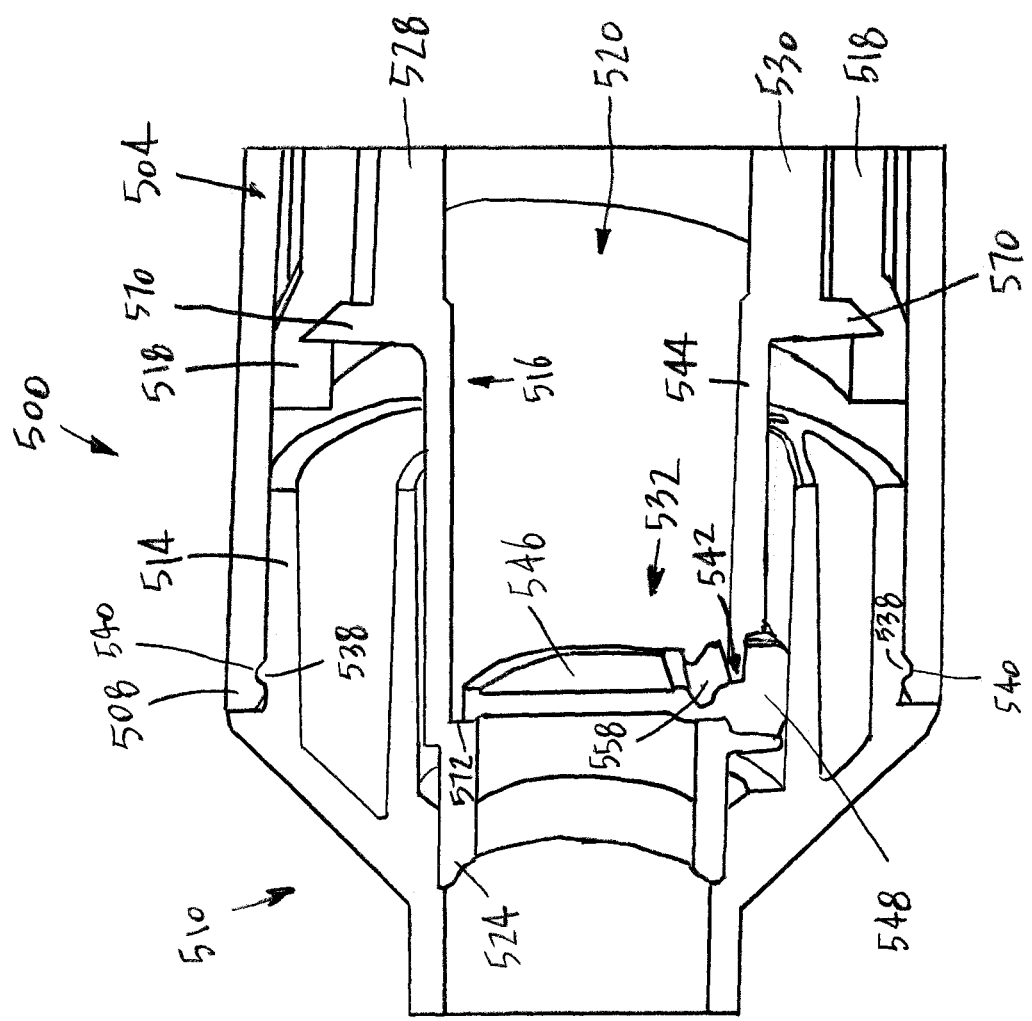
FIG. 14 is an enlarged partial cross-sectional view of the disposable dental waste filter device shown in FIG. 11.

Referring now to FIG. 14, a partial cross-sectional view of the disposable dental waste filter device 500 is illustrated. The device 500 has the body 502 having the cap receiving end 508, the cap portion 510 having the outlet end 514 for insertion into the cap receiving end 508, a valve insert assembly 516 for insertion into the body 502 and the cap portion 510, and the filter assembly 518. The lumen 520 is formed through the body 502, the cap portion 510, the valve insert assembly 516, and the filter assembly 518. The valve insert assembly 516 comprises the inlet end 524 for insertion into the outlet end 514 of the cap portion 510 and the outlet end 526 having the pair of posts 528 and 530 that are used to open up the filter assembly 518. The outlet end 526 of the valve insert assembly 516 also has a peripheral rim 570 that is used to retain the filter assembly 518 in place. The valve 532 is inserted into the valve insert assembly 516 through the opening 542 formed in the bottom 544 of the assembly 516 to block or unblock the lumen 520. The valve insert assembly 516 also has an upper seat portion 572 that the flap portion 546 rests against when the valve 532 is in a closed position or blocking the lumen 520, as is shown. In essence, the upper seat portion 572 prevents the flap portion 546 from moving into the cap portion 510 to prevent back flow from the body 502 and the filter assembly 518. The cap portion 510 also has the circular rim 538 that is used to snap into the circular recess 540 formed in the body 502 to secure the cap portion 510 to the body 502. The valve 532 has the flap portion 546, the retention portion 548, and the hinge 558 formed between the flap portion 546 and the retention portion 548. The hinge 558 ensures that the flap portion 546 can only move in one direction to open or close the lumen 520. The flap portion 546 is generally semicircular in shape.

Figure 15:
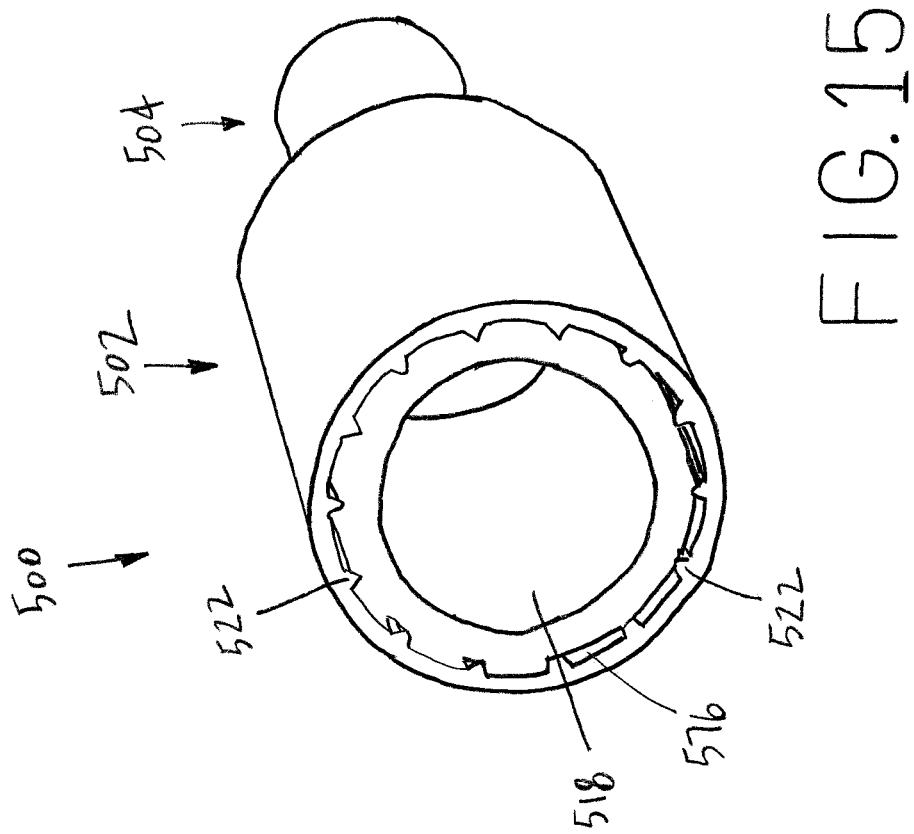
FIG. 15 is a cross-sectional view of a body and a filter assembly of the disposable dental waste filter device shown in FIG. 11.

FIG. 15 shows an enlarged cross-sectional view the body 502 and the filter assembly 518 of the disposable dental waste filter device 500. The body 502 has an interior surface 574 having the number of ribs 522 which are spaced around the interior surface 574. The ribs 522 ensure that there is spacing 576 between the filter assembly 518 and the interior surface 574. In this manner the filter assembly 518 is not completely up against the interior surface 574 and this provides for continuous air flow when the filter assembly 518 is initially loading with material such as amalgam. The suction tube receiving end 504 is also shown.

The disposable dental waste filter devices 10, 100, 150, 200, 300, 350, 400, and 500 may be formed of any suitable material such as plastic, polyethylene, and high density polyethylene or any other suitable material that is disposable and recyclable. Any suitable plastic may be used to construct the devices 10, 100, 150, 200, 300, 350, 400, and 500 so that the devices 10, 100, 150, 200, 300, 350, 400, and 500 may withstand use in a dental operation or procedure and are capable of containing hazardous waste. It is also possible and contemplated to incorporate an antimicrobial agent or chemical in the plastic or to provide a coating of an antimicrobial agent on the plastic to further prevent cross-contamination when using the devices 10, 100, 150, 200, 300, 350, 400, and 500. As can be appreciated, the antimicrobial agent may be incorporated into any of the components of the devices 10, 100, 150, 200, 300, 350, 400, and 500. It is further possible and contemplated that the various filters described herein may be constructed of various materials such as, by way of example only, plastic, aluminum, carbon, coconut, cotton, wool, fibers, spun polymers, spun polypropylene, or any other suitable filtering media.

From all that has been said, it will be clear that there has thus been shown and described herein a disposable dental waste filter device which fulfills the various advantages sought therefore. It will become apparent to those skilled in the art, however, that many changes, modifications, variations, and other uses and applications of the subject disposable dental waste filter device are possible and contemplated. All changes, modifications, variations, and other uses and applications which do not depart from the spirit and scope of the disclosure are deemed to be covered by the disclosure, which is limited only by the claims which follow.

What is claimed is:

1. A disposable dental waste filter device comprises:
    a body having a tube receiving end having an outlet and a cap receiving end;
    a cap portion having an inlet and an outlet end for insertion into the cap receiving end;
    a valve insert assembly comprising an inlet end for insertion into the outlet end of the cap portion and an outlet end having a pair of prongs for insertion into the cap receiving end of the body a valve for insertion into the opening formed in the bottom of the valve insert assembly, the valve comprising a flap portion and a retention portion having a first end, a central portion having an extension member, and a second end; and
    a filter assembly positioned within the body.

2. The disposable dental waste filter device of claim 1 wherein the body further comprises a circular recess and the cap portion further comprises a circular rim for the cap portion to engage the body in a snap fit type engagement.

3. The disposable dental waste filter device of claim 1 wherein the body and the cap portion are constructed of plastic.

4. The disposable dental waste filter device of claim 1 wherein the valve insert assembly further comprises a valve to prevent amalgam from escaping from within the body.

5. The disposable dental waste filter device of claim 4 wherein the valve may be moved into a closed position or an opened position.

6. The disposable dental waste filter device of claim 1 wherein the valve insert assembly further comprises a valve having a flap portion, a retention portion, and a hinge between the flap portion and the retention portion.

7. The disposable dental waste filter device of claim 1 wherein the filter assembly comprises a material that is capable of capturing amalgam as small as 1 micron.

8. A disposable dental waste filter device comprises:
    a body having a tube receiving end having an outlet and a cap receiving end and an interior having a plurality of ribs;
    a cap portion having an inlet and an outlet end for insertion into the cap receiving end;
    a valve insert assembly comprising an inlet end for insertion into the outlet end of the cap portion and an outlet end having a pair of prongs for insertion into the cap receiving end of the body a valve for insertion into the opening formed in the bottom of the valve insert assembly, the valve comprising a flap portion and a retention portion having a first end, a central portion having an extension member, and a second end; and
    a filter assembly positioned within the body.

9. The disposable dental waste filter device of claim 8 wherein the body and the cap portion are constructed of plastic.

10. The disposable dental waste filter device of claim 8 wherein the body further comprises a circular recess and the cap portion further comprises a circular rim for the cap portion to engage the body in a snap fit type engagement.

11. The disposable dental waste filter device of claim 8 wherein the valve insert assembly further comprises a valve to prevent amalgam from escaping from within the body.

12. The disposable dental waste filter device of claim 11 wherein the valve may be moved into a closed position or an opened position.

13. The disposable dental waste filter device of claim 8 wherein the valve insert assembly further comprises a valve having a flap portion, a retention portion, and a hinge between the flap portion and the retention portion.

14. The disposable dental waste filter device of claim 8 wherein the filter assembly comprises a material that is capable of capturing amalgam as small as 1 micron.

15. A disposable dental waste filter device comprises:
    a body having a tube receiving end having an outlet and a cap receiving end;
    a cap portion having an inlet and an outlet end for insertion into the cap receiving end;
    a valve insert assembly having a bottom with the valve insert assembly for insertion into the body and the cap portion having a valve, the valve insert assembly comprising an opening formed in the bottom, a first ledge member, a second ledge member having a first ledge portion, a central indented ledge portion, and a second ledge portion;
    a valve for insertion into the opening formed in the bottom of the valve insert assembly, the valve comprising a flap portion and a retention portion having a first end, a central portion having an extension member, and a second end; and
    a filter assembly positioned within the body.

16. The disposable dental waste filter device of claim 15 wherein the valve insert assembly further comprises an upper seat portion against which the valve is positioned.

17. The disposable dental waste filter device of claim 15 wherein the valve comprises a hinge between the flap portion and the retention portion.

18. The disposable dental waste filter device of claim 15 wherein the filter assembly comprises a material that is capable of capturing amalgam as small as 1 micron.

19. The disposable dental waste filter device of claim 15 wherein the central indented ledge portion captures the central portion of the retention portion to retain the retention portion in the bottom of the valve insert assembly.

20. The disposable dental waste filter device of claim 15 wherein the body further comprises a circular recess and the cap portion further comprises a circular rim for the cap portion to engage the body in a snap fit type engagement.

* * * * *